Patented Oct. 8, 1946

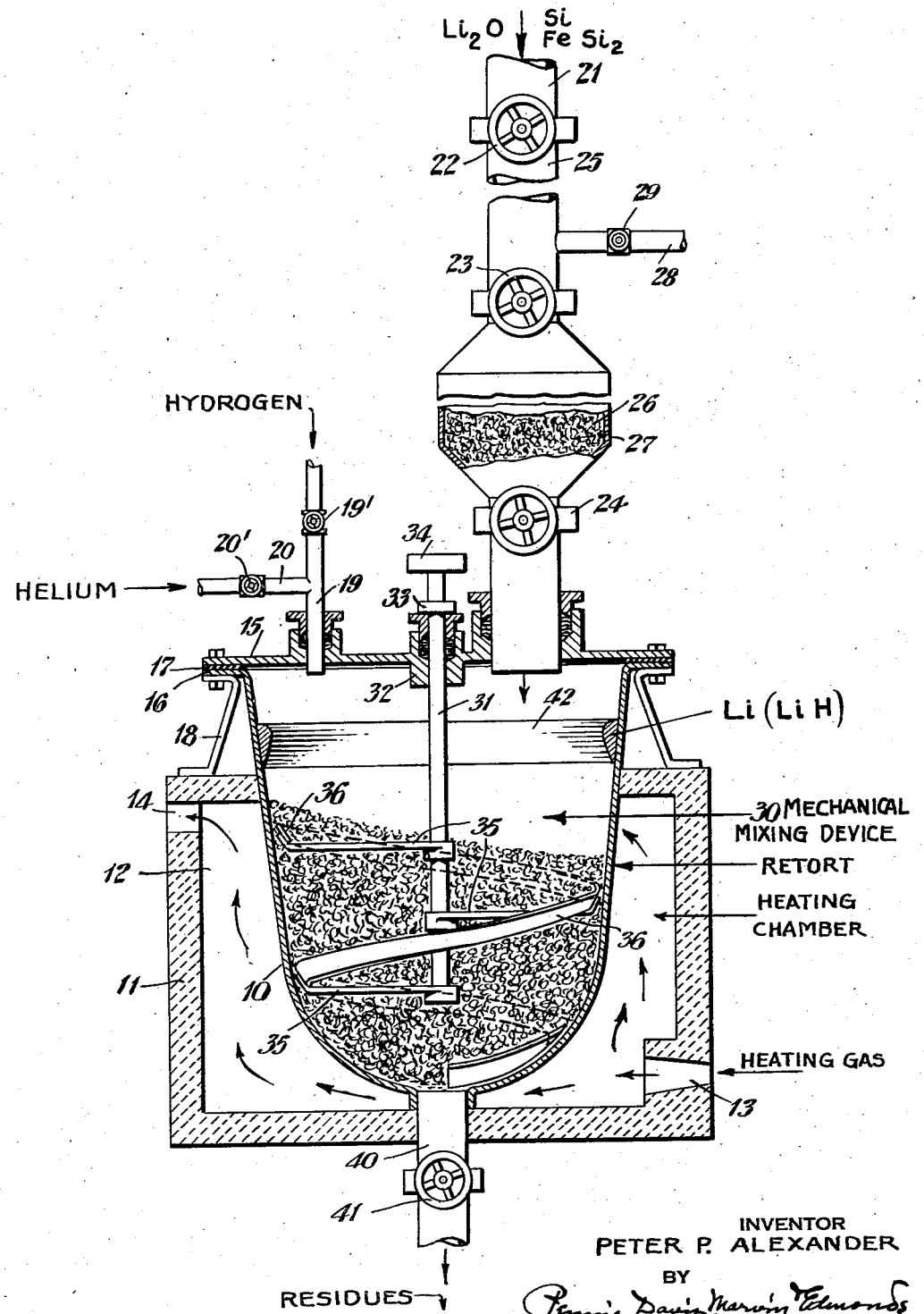

2,408,748

UNITED STATES PATENT OFFICE 2,408,748

PRODUCTION OF LITHIUM HYDRIDE

Peter P. Alexander, Marblehead, Mass., assignor to Metal Hydrides Incorporated, Beverly, Mass., a corporation of Massachusetts Application September 30, 1944, Serial No. 556,578

21 Claims. (Cl. 23—204)

This invention relates to the production of lithium hydride and has for its object certain improvements in the method of producing lithium hydride.

Lithium hydride is a highly desirable compound because of its great activity. It is particularly useful, for example, in the production of hydrogen gas when brought into contact with water:

$$LiH + H_2O \rightarrow H_2 + LiOH$$

A commercially satisfactory method of producing the lithium hydride has not heretofore been developed.

Such lithium hydride as has been made is generally obtained by passing hydrogen gas over heated metallic lithium produced electrolytically. Lithium produced by electrolysis has been quite expensive, currently selling for around $15.00 per pound, so that this method of producing lithium hydride commercially has met with little favor.

As a result of my investigations, I have discovered a relatively simple and inexpensive method of producing lithium hydride. The necessary metallic lithium is obtained pyrometallurgically by the reduction of a lithium compound in a suitable reaction chamber and is preferably converted to the desired lithium hydride in the same chamber as part of the same operation.

In accordance with the invention, a charge of finely-divided lithium compound and silicon-bearing reducing material is confined in a reaction zone. The charge and reaction zone are placed under vacuum to remove objectionable air and moisture. The charge is heated to a temperature sufficiently high to reduce the lithium compound and to distill the resulting metallic lithium. The distilled lithium is condensed in a cooler part of the reaction zone removed from the charge. Hydrogen gas is then admitted into the reaction zone and the condensed lithium is converted to lithium-hydride.

Various lithium compounds may be used in the practice of the invention, such as lithium oxide, lithium carbonate, lithium citrate, lithium silicate, etc. To this end, lithium ore concentrates may be employed. A particularly suitable source of lithium is lithium oxide. Silicon and silicon alloys, such as ferro-silicon, are now available in large quantities at relatively low prices and are suitable as a silicon-bearing material to effect reduction of the lithium compound. Ferro-silicon containing up to 90% silicon in the form of fine powder is commercially available and is well adapted for the present invention.

The reactions that take place may be generally indicated as follows:

$$2Li_2O + Si \rightarrow SiO_2 + 4Li$$
$$4Li_2O + FeSi_2 \rightarrow 2SiO_2 + Fe + 6Li$$
$$2Li + H_2 \rightarrow 2LiH$$

The lithium oxide reacts with the silicon or ferro-silicon to form silicon oxide and metallic lithium. The silicon-oxide remains in the charge as a residue, while the reduced lithium is distilled and condensed in a cooler part of the reaction chamber, removed from the charge. The hydrogen reacts with the condensed lithium to form lithium hydride. After the reaction chamber and its contents have cooled sufficiently, the chamber is opened and the lithium hydride removed.

While the reduction step may be conducted in the reaction zone while it is under vacuum, it is preferable to break the vacuum after the objectionable air and moisture have been removed by admitting an inert gas, such as helium or argon, or both, in amount sufficient to place the reaction zone under substantial positive pressure, for example, 15 pounds. An important advantage of the inert gas is that if the reaction chamber should spring a leak, the inert gas seeps out instead of air and moisture seeping into the reaction chamber. The pressure within the reaction zone may be maintained by introducing further amounts of inert gas to compensate for that lost by seepage, thus insuring exclusion of outside air and moisture.

Due to the exothermic nature of the reaction of the condensed lithium with the hydrogen gas, it is best to admit the hydrogen slowly and to have it become admixed with the inert gas in the reaction zone; for example, as described in my copending application Serial No. 544,047, filed July 8, 1944, so that objectionable fusion of the lithium and dissociation of the lithium hydride may be prevented.

These and other features of the invention will be better understood by referring to the accompanying drawing, which illustrates diagrammatically an apparatus usable in a practice of the invention, as well as to the following description.

The apparatus shown comprises a pot retort 10 suitably suspended within a furnace 11 having a heating chamber 12 with a conduit 13 near the bottom through which to introduce heating gases into the chamber, and a flue opening 14 near the top thereof through which to remove spent gases from the chamber. The retort is advantageously made of heat-resistant steel. It is provided with a removable cover 15, which may be bolted to a flange 16 extending circumferentially around the open end of the retort, a gasket 17 being disposed between the two to provide a non-leaking joint. The retort is suspended in the chamber by means of a plurality of spaced supports 18 extending between the flange and the top of the furnace.

The cover is provided with a pipe 19 having a valve 19' for the controlled passage of hydrogen gas, a pipe 20 having a valve 20' connecting the other pipe for the controlled passage of inert gas, into the retort; a charging conduit 21 to supply lithium compound, such as lithium oxide, and silicon-bearing material, such as silicon or ferrosilicon, to the interior of the retort. As shown, the conduit is fitted with three spaced valves 22, 23, and 24, to provide an evacuating passageway 25 and a trap 26 of sufficient size to receive a substantial charge, for example, of lithium oxide and silicon or ferro-silicon 27. A pipe 28 with a valve 29 connects the evacuating passageway with a source of vacuum, not shown.

A mechanical mixing device 30 fits within the interior of the retort. It is provided with a vertical shaft 31, the upper end of which extends through the cover and is suitably held in position by a bearing 32 and a collar 33 secured to the shaft. The upper end of the shaft is also equipped with a pulley 34 connectible with a source of power, not shown. The lower part of the shaft is fitted with a plurality of lateral supports 35 to which is attached a helical metallic ribbon 36 adapted to follow the contour of the inside of the retort so as to raise charge materials confined therein along the inside surface of the retort, and then to roll them toward the center, thereby intimately mixing the charge materials.

A discharge conduit 40 connects with the bottom of the retort and extends through the bottom of the furnace. A valve 41 is provided in the conduit below the furnace bottom for the removal of residues from the retort.

In accordance with the practice of the invention, cover 15 is appropriately bolted to flange 16 to assure a sealed joint. Heating gases are passed through conduit 13 into heating chamber 12, so that the bottom of retort 10 is heated. Spent heating gases escape through flue opening 14. Valves 24, 23 and 29 are opened and valves 19', 20', 22 and 41 are closed until the air, moisture and other gaseous products are evacuated from the interior of the retort. This may be accomplished by connecting conduit 28 with a vacuum pump, not shown. To hasten the evacuation step, the temperature of the interior of the retort is suitably raised.

On completion of the evacuation step, valves 24 and 29 are closed, valve 22 is opened and charge 27 of lithium oxide, silicon or ferro-silicon is passed into conduit 21 and dropped into trap 26; after which valve 22 is closed and valve 29 is opened to evacuate air and moisture from trap 26 and charge 27. Valves 23 and 29 are then closed and valve 24 is opened so that the charge is dropped into the retort.

Additional heating gases are passed into heating chamber 12 to raise the temperature of the charge within retort 10 to a temperature at which the reduction of the lithium oxide may proceed satisfactorily. Mechanical mixing device 30 is rotated to mix the charge intimately. While the temperature may be checked in various ways, it is practical to employ a hollow shaft 31, in which is placed a suitable thermocouple.

In the presently preferred practice, valve 25 is opened, after charge 27 is dropped into retort 10 and valve 24 is closed, to admit inert gas, such as helium or argon, or both, in amount sufficient to place and maintain the reaction zone under substantial positive pressure, for example 15 pounds. The charge is then heated and mixed before and during the reduction reaction.

As the lithium oxide is reduced, the resulting metallic lithium is distilled and condensed in a cooler part of the retort. Due to the manner in which the retort is suspended in the heating chamber, the upper end of the retort extending above the heating chamber, there is a gradual temperature gradient from the bottom to the top of the retort, so that as the distilled lithium rises from the charge, it meets an environment conducive to condensation. When operating under the conditions described, the distilled lithium tends to condense in the form of an annular ring 42 directly above the top of the heating chamber Valve 19 is then opened to admit controlled amounts of hydrogen gas to the interior of the retort. Unless the temperature of the condensed lithium within the retort is insufficient to initiate the reaction with the hydrogen, introduction of further heating gases into the heating chamber is terminated. As pointed out above, the reaction between lithium and hydrogen is an exothermic one and, unless special precautions are taken, objectionable overheating takes place, thereby causing fusion of the lithium or dissociation of the newly-formed lithium hydride. To prevent this undesirable result, the inert gas is retained in the retort so that the hydrogen may be admixed and diluted therewith. If the inert gas in the retort is maintained at an optimum pressure, the amount of exothermic heat released by the hydriding reaction may be simply controlled by the regulating the rate at which hydrogen gas is admitted to the retort. This may be done automatically, as described in my above-mentioned copending application. A sufficient amount of hydrogen is thus admitted to effect complete conversion of the condensed lithium to lithium hydride.

The retort and its contents are then permitted to cool. Valves 19' and 20' are closed and cover 15 is removed. The lithium hydride is then suitably recovered from the retort.

It will be clear to those skilled in this art that the above example is only by way of illustration; that the practice of the invention readily lends itself to a number of useful modifications; and that the invention offers a relatively simple and inexpensive method of producing lithium hydride.

I claim:

1. In the method of producing lithium hydride, the improvement which comprises confining a charge of lithium compound and silicon-bearing material in a reaction zone, subjecting the charge and reaction zone to a vacuum to remove objectionable air and moisture, heating the charge to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

2. In the method of producing lithium hydride, the improvement which comprises confining a charge of lithium compound and silicon-bearing material in a reaction zone, subjecting the charge and reaction zone to a vacuum to remove objectionable air and moisture, admitting inert gas to the reaction zone in amount sufficient to place it under substantial positive pressure, heating the charge to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

3. In the method of producing lithium hydride, the improvement which comprises confining a charge of finely-divided lithium compound and silicon-bearing material in a reaction zone, subjecting the charge and reaction zone to a vacuum to remove objectionable air and moisture, heating the charge to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

4. In the method of producing lithium hydride, the improvement which comprises confining a charge of finely-divided lithium compound and silicon-bearing material in a reaction zone, subjecting the charge and reaction zone to a vacuum to remove objectionable air and moisture, admitting inert gas to the reaction zone in amount sufficient to place it under substantial positive pressure, heating the charge to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

5. In the method of producing lithium hydride, the improvement which comprises confining a charge of finely-divided lithium compound and silicon-bearing material in a reaction zone, subjecting the charge and reaction zone at an elevated temperature to a vacuum to remove objectionable air and moisture, heating the charge to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

6. In the method of producing lithium hydride, the improvement which comprises confining a charge of finely-divided lithium compound and silicon-bearing material in a reaction zone, subjecting the charge and reaction zone at an elevated temperature to a vacuum to remove objectionable air and moisture, heating the charge while under vacuum to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

7. In the method of producing lithium hydride, the improvement which comprises confining a charge of finely-divided lithium compound and silicon-bearing material in a reaction zone, subjecting the charge and reaction zone at an elevated temperature to a vacuum to remove objectionable air and moisture, admitting inert gas to the reaction zone in amount sufficient to place it under substantial positive pressure, heating the charge to a temperature sufficiently high to reduce the lithium compound and to distill the resulting metallic lithium, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

8. In the method of producing lithium hydride, the improvement which comprises confining a charge of lithium oxide and silicon-bearing material in a reaction zone, subjecting the charge and reaction zone to a vacuum to remove objectionable air and moisture, heating the charge to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

9. In the method of producing lithium hydride, the improvement which comprises confining a charge of lithium oxide and silicon-bearing material in a reaction zone, subjecting the charge and reaction zone to a vacuum to remove objectionable air and moisture, admitting inert gas to the reaction zone in amount sufficient to place it under substantial positive pressure, heating the charge to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

10. In the method of producing lithium hydride, the improvement which comprises confining a charge of finely-divided lithium oxide and silicon-bearing material in a reaction zone, subjecting the charge and reaction zone to a vacuum to remove objectionable air and moisture, heating the charge to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

11. In the method of producing lithium hydride, the improvement which comprises confining a charge of finely-divided lithium oxide and silicon-bearing material in a reaction zone, subjecting the charge and reaction zone to a vacuum to remove objectionable air and moisture, admitting inert gas to the reaction zone in amount sufficient to place it under substantial positive pressure, heating the charge to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

12. In the method of producing lithium hydride, the improvement which comprises confining a charge of finely-divided lithium oxide and silicon-bearing material in a reaction zone, subjecting the charge and reaction zone at an elevated temperature to a vacuum to remove objectionable air and moisture, heating the charge to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

13. In the method of producing lithium hydride, the improvement which comprises confining a charge of finely-divided lithium oxide and silicon-bearing material in a reaction zone, subjecting the charge and reaction zone at an elevated temperature to a vacuum to remove objectionable air and moisture, heating the charge while under vacuum to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen to lithium hydride.

14. In the method of producing lithium hydride, the improvement which comprises confining a charge of finely-divided lithium oxide and silicon-bearing material in a reaction zone, subjecting the charge and reaction zone at an elevated temperature to a vacuum to remove objectionable air and moisture, admitting inert gas to the reaction zone in amount sufficient to place it under substantial positive pressure, heating the charge to a temperature sufficiently high to reduce the lithium oxide and to distill the resulting metallic lithium, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

15. In the method of producing lithium hydride, the improvement which comprises confining a charge of lithium oxide and silicon-bearing material in a reaction zone, subjecting the charge and reaction zone to a vacuum to remove objectionable air and moisture, heating the charge to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen to lithium hydride.

16. In the method of producing lithium hydride, the improvement which comprises confining a charge of lithium oxide and silicon-bearing material in a reaction zone, subjecting the charge and reaction zone to a vacuum to remove objectionable air and moisture, admitting inert gas to the reaction zone in amount sufficient to place it under substantial positive pressure, heating the charge to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

17. In the method of producing lithium hydride, the improvement which comprises confining a charge of finely-divided lithium oxide and silicon-bearing material in a reaction zone, subjecting the charge and reaction zone to a vacuum to remove objectionable air and moisture, heating the charge to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen to lithium hydride.

18. In the method of producing lithium hydride, the improvement which comprises confining a charge of finely-divided lithium oxide and silicon-bearing material in a reaction zone, subjecting the charge and reaction zone to a vacuum to remove objectionable air and moisture, admitting inert gas to the reaction zone in amount sufficient to place it under substantial positive pressure, heating the charge to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

19. In the method of producing lithium hydride, the improvement which comprises confining a charge of finely-divided lithium oxide and silicon-bearing material in a reaction zone, subjecting the charge and reaction zone at an elevated temperature to a vacuum to remove objectionable air and moisture, heating the charge to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen to lithium hydride.

20. In the method of producing lithium hydride, the improvement which comprises confining a charge of finely-divided lithium oxide and silicon-bearing material in a reaction zone, subjecting the charge and reaction zone at an elevated temperature to a vacuum to remove objectionable air and moisture, heating the charge while under vacuum to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen to lithium hydride.

21. In the method of producing lithium hydride, the improvement which comprises confining a charge of finely-divided lithium oxide and silicon-bearing material in a reaction zone, subjecting the charge and reaction zone at an elevated temperature to a vacuum to remove objectionable air and moisture, admitting inert gas to the reaction zone in amount sufficient to place it under substantial positive pressure, heating the charge to a temperature sufficiently high to reduce the lithium oxide and to distill the resulting metallic lithium, intimately admixing the charge while the reduction of the lithium oxide and the distillation of the resulting metallic lithium take place to insure contact of the silicon-bearing material with particles of unreduced lithium oxide, condensing the distilled lithium in a cooler portion of the reaction zone removed from the charge, admitting hydrogen gas to the reaction zone, and converting the condensed lithium by reaction with the hydrogen in the presence of the inert gas to lithium hydride.

PETER P. ALEXANDER.